US011581723B2

(12) United States Patent
Easwaran et al.

(10) Patent No.: US 11,581,723 B2
(45) Date of Patent: Feb. 14, 2023

(54) HIGH VOLTAGE TOLERANT ANALOG-DIGITAL OUTPUT

(71) Applicant: TEXAS INSTRUMENTS INCORPORATED, Dallas, TX (US)

(72) Inventors: Sri Navaneethakrishnan Easwaran, Plano, TX (US); Zhipeng Ye, Allen, TX (US); Deepak Sreedharan, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 192 days.

(21) Appl. No.: 17/101,215

(22) Filed: Nov. 23, 2020

(65) Prior Publication Data

US 2021/0408778 A1  Dec. 30, 2021

Related U.S. Application Data

(60) Provisional application No. 63/045,896, filed on Jun. 30, 2020.

(51) Int. Cl.
*H02H 1/00* (2006.01)
*H02H 3/20* (2006.01)
(52) U.S. Cl.
CPC ............ *H02H 1/0007* (2013.01); *H02H 3/20* (2013.01)

(58) Field of Classification Search
CPC ........ H02H 1/0007; H02H 3/20; H02H 3/202; H02H 9/046
See application file for complete search history.

(56) References Cited

U.S. PATENT DOCUMENTS

| | | | | |
|---|---|---|---|---|
| 7,755,432 B1* | 7/2010 | Krishnamoorthy | ..... | H03F 1/523 330/207 P |
| 10,520,971 B2 | 12/2019 | Easwaran et al. | | |
| 10,608,431 B2* | 3/2020 | He | ....... | H01L 23/5286 |
| 2008/0265682 A1* | 10/2008 | Huang | .... | H02J 9/061 307/64 |
| 2019/0025866 A1* | 1/2019 | Easwaran | ............... | G05F 3/262 |

* cited by examiner

*Primary Examiner* — Jared Fureman
*Assistant Examiner* — Nicolas Bellido
(74) *Attorney, Agent, or Firm* — John R. Pessetto; Frank D. Cimino

(57) ABSTRACT

An integrated circuit includes an output terminal, an analog output circuit, a digital output circuit, and a protection circuit. The analog output circuit includes an output coupled to the output terminal. The digital output circuit includes an output. The protection circuit includes a protection transistor and a comparator circuit. The protection transistor includes a first terminal coupled to the output of the digital output circuit, a second terminal coupled to the output terminal, and a control terminal. The comparator circuit includes a first input coupled to the output terminal, a second input coupled to a reference current source, and an output coupled to the control terminal of the protection transistor.

17 Claims, 3 Drawing Sheets

HIGH VOLTAGE TOLERANT ANALOG-DIGITAL OUTPUT

CROSS-REFERENCE TO RELATED APPLICATION

This application claims priority to U.S. Provisional Application 63/045,896, filed Jun. 30, 2020, titled "High Voltage Tolerant Analog/Digital Output," which is hereby incorporated by reference in its entirety.

BACKGROUND

As the amount of circuitry fabricated on an integrated circuit increases, additional input/output (I/O) pins are needed to utilize the functionality provided by the circuitry. Additional I/O pins are added to a chip as metallic pads or pins. Based on a given package and pin out, only a limited number of I/O pins can be accommodated. The I/O pins can be formed on the edge of the chip or on the planar face of the chip. In cases where there are more signals than corresponding I/O pins available on the integrated circuit, multiple signals may be multiplexed onto a single I/O pin.

SUMMARY

In one example, an integrated circuit includes an output terminal, an analog output circuit, a digital output circuit, and a protection circuit. The analog output circuit includes an output coupled to the output terminal. The digital output circuit includes an output. The protection circuit includes a protection transistor and a comparator circuit. The protection transistor includes a first terminal coupled to the output of the digital output circuit, a second terminal coupled to the output terminal, and a control terminal. The comparator circuit includes a first input coupled to the output terminal, a second input coupled to a reference current source, and an output coupled to the control terminal of the protection transistor.

In another example, an integrated circuit includes an output terminal, an analog output circuit, a digital output circuit, and a protection circuit. The analog output circuit is configured to drive the output terminal. The digital output circuit is configured to drive the output terminal. The protection circuit is coupled to the digital output circuit and the output terminal. The protection circuit is configured to compare a voltage at the output terminal to a voltage that powers the digital output circuit, and to disconnect the digital output circuit from the output terminal based on the voltage at the output terminal being greater than the voltage that powers the digital output circuit.

In a further example, an output protection circuit includes an input, an output, a first transistor, a second transistor, and a comparator circuit. The first transistor includes a first terminal coupled to the input of the output protection circuit, a second terminal, and a control terminal. The second transistor includes a first terminal coupled to the second terminal of the first transistor, a second terminal coupled to the output terminal of the output protection circuit, and a control terminal coupled to the control terminal of the first transistor. The comparator circuit includes a first input coupled to the output of the output protection circuit, a second input coupled to a reference voltage source, and an output coupled to the control terminal of the first transistor.

BRIEF DESCRIPTION OF THE DRAWINGS

For a detailed description of various examples, reference will now be made to the accompanying drawings in which.

DETAILED DESCRIPTION

The number of input/output (I/O) terminals that can be fabricated on an integrated circuit is limited by die area and cost. To accommodate the limited number of terminals, an analog signal and a digital signal may share an I/O terminal. An analog output circuit coupled to a shared I/O terminal may include an output transistor capable of withstanding a relatively high voltage (e.g., 40 volts) and driving a relatively high current (e.g., 6 milliamperes), while a digital output circuit sharing the I/O terminal may be fabricated with low voltage transistors that output a 3.3 volt or 5 volt signal. To prevent the higher analog voltages from damaging the low voltage transistors of the digital output circuit, the digital output circuit may be isolated from the I/O terminal by protection circuitry. In some integrated circuits the protection circuitry protects the digital output circuit only when this digital output circuit is disabled. In such integrated circuits, if high voltage is applied to the I/O terminal when the digital output is enabled, the high voltage can damage the low voltage transistors of the digital output circuit.

The integrated circuits disclosed herein include a protection circuit that protects the low voltage transistors of the digital output circuit when the digital output circuit is enabled and the digital output circuit is forced to a high voltage through the body diodes of protection transistors (PMOS). This leads to reverse current back to the supply and can damage the low voltage circuits. The protection circuit includes a current mode comparator that controls isolation of the digital output circuit from the I/O terminal when voltage on the I/O terminal exceeds the voltage powering the digital output circuit. In some implementations of the protection circuit, the current mode comparator is biasing by a replica biasing rail.

Figure 1:
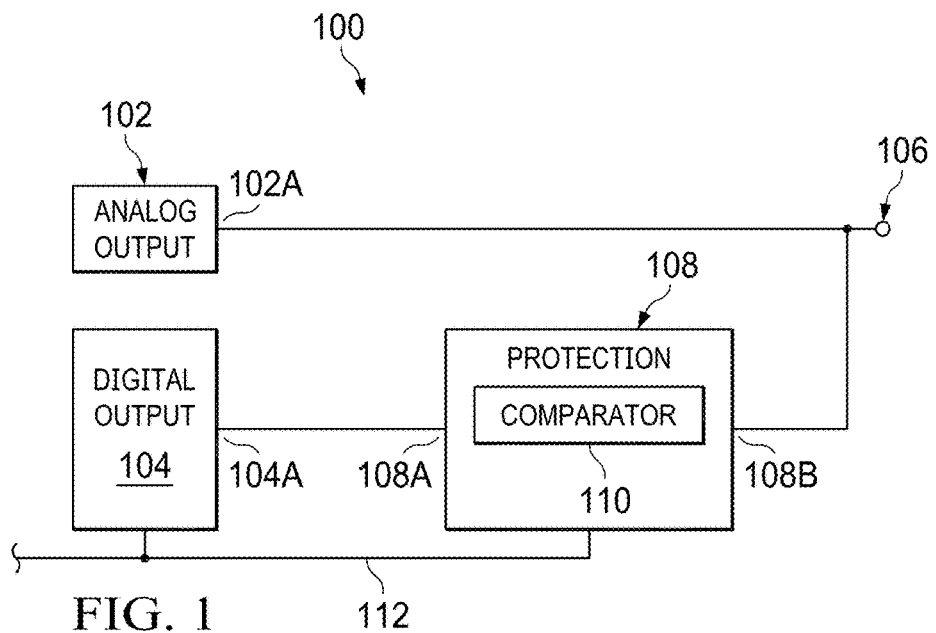
FIG. 1 shows a block diagram for an example output circuit of an integrated circuit.

FIG. 1 shows a block diagram for an example output circuit 100 of an integrated circuit. The output circuit 100 includes an analog output circuit 102, a digital output circuit 104, an output terminal 106 (integrated circuit output terminal), and a protection circuit 108 (output protection circuit). The analog output circuit 102 includes an output 102A that is coupled to and drives the output terminal 106. The digital output circuit 104 includes an output 104A that is coupled to and drives the output terminal 106 via the protection circuit 108.

The protection circuit 108 includes an input 108A and an output 108B. The input 108A of the protection circuit 108 is coupled to the output 104A of the digital output circuit 104, and the output 108B of the protection circuit 108 is coupled to the output terminal 106. The protection circuit 108 includes a comparator circuit 110 that compares voltage at the output terminal 106 to a voltage 112 that powers the low voltage transistors of the digital output circuit 104. If the voltage at the output terminal 106 exceeds the voltage 112, the protection circuit 108 disconnects the digital output circuit 104 from the output terminal 106 to protect the low voltage transistors of the digital output circuit 104. Thus, the protection circuit 108 protects the digital output circuit 104 from high voltages at the output terminal 106 if a high voltage is present on the output terminal 106.

Figure 2:
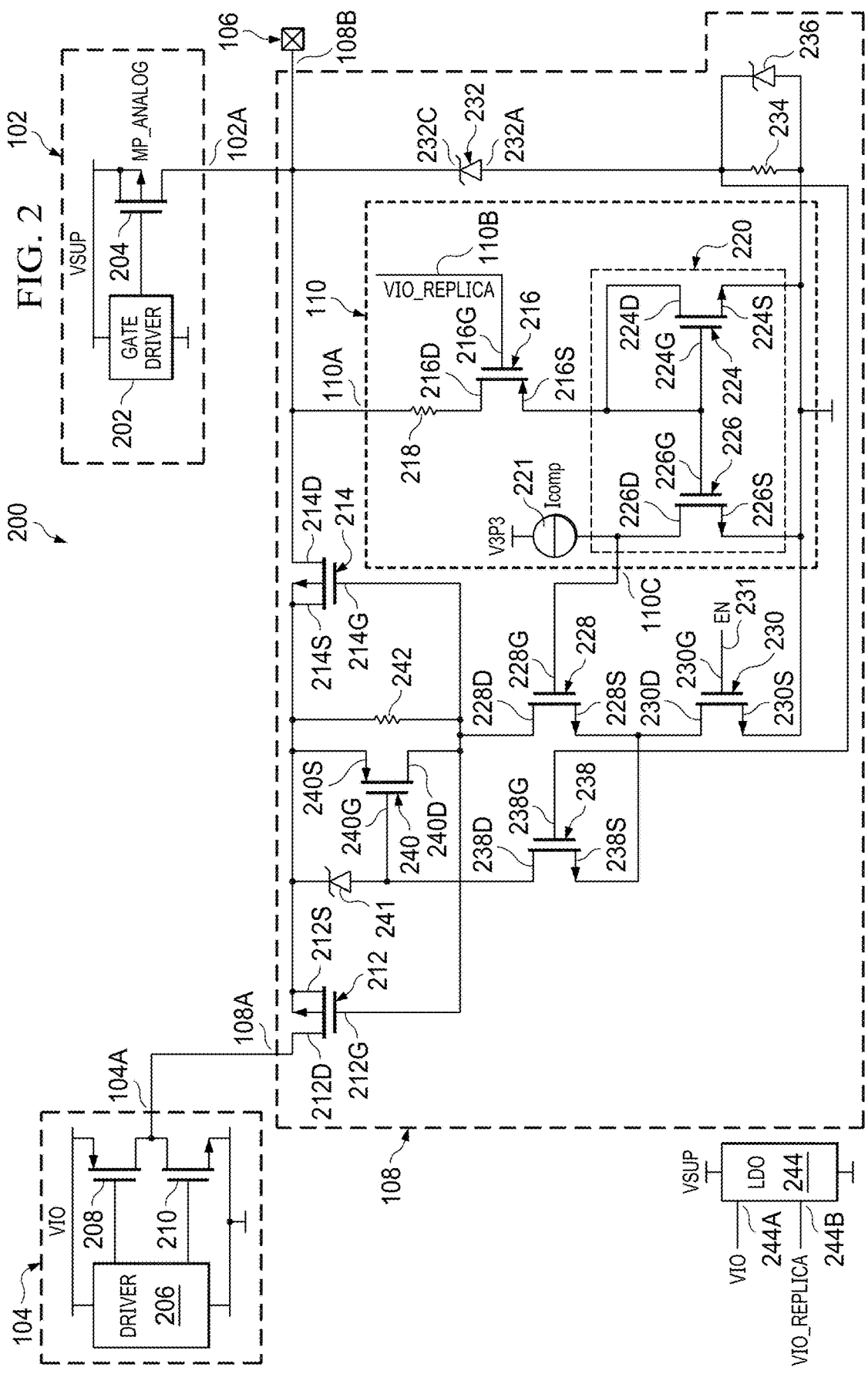
FIG. 2 shows a schematic diagram for an example output circuit of an integrated circuit.

FIG. 2 shows a schematic diagram for an example output circuit 200 of an integrated circuit. The output circuit 200 is an implementation of the output circuit 100. The output circuit 200 includes the analog output circuit 102, the digital output circuit 104, the protection circuit 108, and a voltage regulator circuit 244. The analog output circuit 102 includes an output transistor 204 and a drive circuit 202 that activates the output transistor 204. The output transistor 204 is coupled to the output 102A of the analog output circuit 102.

The digital output circuit 104 includes low voltage output transistor 208, low voltage output transistor 210, driver circuit 206 that activates the low voltage output transistor 208 and the low voltage output transistor 210. The low voltage output transistor 208 and the low voltage output transistor 210 are coupled to the output 104A of the digital output circuit 104, and coupled to the output terminal 106 via the protection circuit 108.

The voltage regulator circuit 244 powers the digital output circuit 104 and provides a reference voltage to the protection circuit 108. The voltage regulator circuit 244 includes a power output 244A that is coupled to the digital output circuit 104, and reference voltage output (reference voltage source) 244B that is coupled to the protection circuit 108. The voltages provided at the reference voltage output 244B and the power output 244A are nominally the same. Additional description of the voltage regulator circuit 244 is provided with respect to FIG. 3.

The protection circuit 108 includes a protection transistor 212, a protection transistor 214, and the comparator circuit 110. The protection transistor 212 and the protection transistor 214 are p-type field effect transistors (FETs) in some implementations of the protection circuit 108. A drain terminal 212D of the protection transistor 212 is coupled the input 108A of the protection circuit 108. The source terminal 212S of the protection transistor 212 is coupled to the source terminal 214S of the protection transistor 214. The drain terminal 214D of the protection transistor 214 is coupled to the output 108B of the protection circuit 108. The gate terminal 214G (control terminal) of the protection transistor 214 is coupled to the gate terminal 212G of the protection transistor 212. The protection transistor 212 and the protection transistor 214 are activated to connect the digital output circuit 104 to pass signal between the digital output circuit 104 and the output terminal 106. The protection transistor 212 and the protection transistor 214 are deactivated to isolate the digital output circuit 104 from the output terminal 106.

The comparator circuit 110 controls activation and deactivation of the protection transistor 212 and the protection transistor 214. The comparator circuit 110 includes an input 110A, an input 1106, an output 110C, a transistor 216, a resistor 218, a current mirror circuit 220, and a current source 221. The transistor 216 is a p-type FET is some implementations of the comparator circuit 110. A drain terminal 216D of the transistor 216 is coupled to the input 110A and the output 108B (and the output terminal 106) via the resistor 218, and a gate terminal 216G (control terminal) of the transistor 216 is coupled to the input 1106 and the voltage regulator circuit 244 (e.g., the reference voltage output 244B of the voltage regulator circuit 244). When the voltage at the output terminal 106 exceeds the voltage output by the voltage regulator circuit 244 (e.g., the voltage powering the digital output circuit 104), the transistor 216 turns on and the current flowing through the transistor 216 increases. A source terminal 216S of the transistor 216 is coupled to the current mirror circuit 220.

The current mirror circuit 220 includes a diode-connected transistor 224 and a transistor 226. The diode-connected transistor 224 and the transistor 226 are n-type FETs in some implementations of the current mirror circuit 220. A drain terminal 224D of the diode-connected transistor 224 is coupled to the source terminal 216S of the transistor 216 and to the gate terminal 224G of the diode-connected transistor 224. A source terminal 224S of the diode-connected transistor 224 is coupled to ground. A drain terminal 226D of the transistor 226 is coupled to a current source 221 and the output 110C. A gate terminal 226G of the transistor 226 is coupled to the gate terminal 224G of the diode-connected transistor 224. A source terminal 226S of the transistor 226 is coupled to ground. As current flow through the diode-connected transistor 224 and the transistor 226 increases, the voltage at the drain terminal 226D of the transistor 226 drops.

The drain terminal 226D of the transistor 226 is coupled to the transistor 228. The transistor 228 is an n-type FET is some implementations of the protection circuit 108. A gate terminal 228G of the transistor 228 is coupled to the drain terminal 226D of the transistor 226. A drain terminal 228D of the transistor 228 is coupled to the gate terminal 212G of the protection transistor 212 and the gate terminal 214G of the protection transistor 214. When the transistor 228 is deactivated by the reduction of voltage at the gate terminal 228G of the transistor 228, the transistor 228 deactivates the protection transistor 212 and the protection transistor 214 to isolate the digital output circuit 104 from the output terminal 106.

A source terminal 228S of the transistor 228 is coupled to ground via the transistor 230. The transistor 230 is an n-type FET in some implementations of the protection circuit 108. The source terminal 228S of the transistor 228 is coupled a drain terminal 230D of the transistor 230. A source terminal 230S of the transistor 230 is coupled to ground. A gate terminal 230G of the transistor 230 is coupled to an enable terminal 231 that enables or disables operation of the protection circuit 108 by enabling control of the protection transistor 212 and the protection transistor 214 by the comparator circuit 110.

The protection circuit 108 also provides protection to the digital output circuit 104 via the Zener diode 232 and the transistor 240. The Zener diode 232 includes a cathode terminal 232C coupled to the output 108B (and the output terminal 106), and an anode terminal 232A coupled to ground via a resistor 234 and Zener diode 236. When the voltage at the output terminal 106 exceeds the reverse breakdown voltage (reference voltage) of the Zener diode 232, current flows through the Zener diode 232 and the voltage at the anode terminal 232A of the Zener diode 232 increases.

The voltage at the anode terminal 232A of the Zener diode 232 controls a transistor 238. The transistor 238 is an n-type FET is some implementations of the protection circuit 108. A gate terminal 238G of the transistor 238 is coupled to the anode terminal 232A of the Zener diode 232. Source terminal 238S of the transistor 238 is coupled to the 230D of the transistor 230. The transistor 238 is activated when the voltage at the output terminal 106 exceeds the reverse breakdown voltage of the Zener diode 232. A drain terminal 238D of the transistor 238 is coupled to the transistor 240.

The transistor 240 deactivates the protection transistor 212 and the protection transistor 214 when the voltage at the output terminal 106 exceeds the reverse breakdown voltage of the Zener diode 232. The transistor 240 is a p-type FET is some implementations of the protection circuit 108. The transistor 240, in parallel with a resistor 242, is coupled from gate to source of the protection transistor 212 and the protection transistor 214. A gate terminal 240G of the transistor 240 is coupled to a drain terminal 238D of the transistor 238, and coupled to the source terminal 212S of the protection transistor 212 via a Zener diode 241. A source terminal 240S of the transistor 240 is coupled to the source terminal 212S of the protection transistor 212 and the source terminal 214S of the protection transistor 214. A drain terminal 240D of the transistor 240 is coupled to the gate terminal 212G of the protection transistor 212 and the gate terminal 214G of the protection transistor 214.

Figure 3:
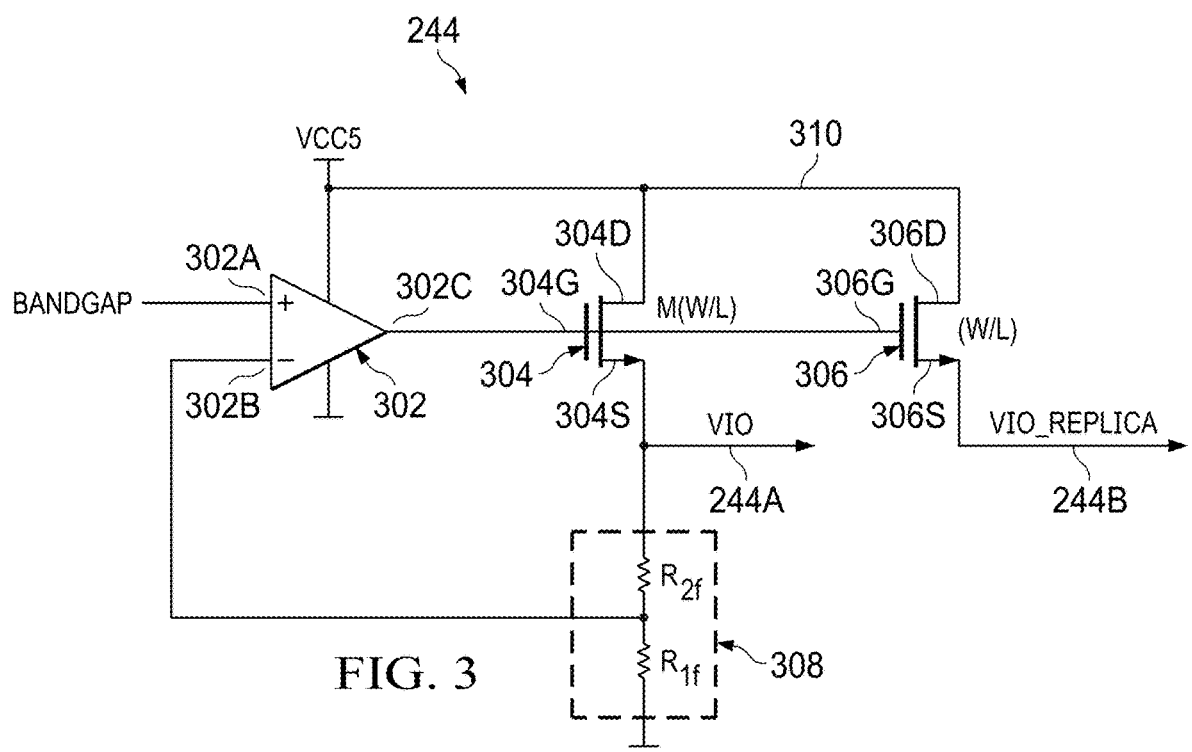
FIG. 3 shows a schematic diagram for an example voltage regulator circuit suitable for use with the output circuit of FIG. 2.

FIG. 3 shows a schematic diagram for an example voltage regulator circuit 244. The voltage regulator circuit 244 includes an amplifier 302, a power transistor 304, a replica transistor 306, and a voltage divider 308. The amplifier 302 amplifies a voltage (e.g., a bandgap voltage) received at a non-inverting input 302A by a constant defined by the voltage divider 308. The voltage divider 308 is coupled to an inverting input 302B of the amplifier 302. An output 302C of the amplifier 302 is coupled to the power transistor 304 and the replica transistor 306.

The power transistor 304 and the replica transistor 306 are n-type FETs in some implementations of the voltage regulator circuit 244. The power transistor 304 is larger (larger channel width) than replica transistor 306 (e.g., by a factor M) in some implementations of the voltage regulator circuit 244 to provide a higher current at the power output 244A than the reference voltage output 244B. A gate terminal 304G of the power transistor 304 is coupled to the output 302C of the amplifier 302. A drain terminal 304D of the power transistor 304 is coupled to a power terminal 310. A source terminal 304S of the power transistor 304 is coupled to the voltage divider 308 and the power output 244A. A gate terminal 306G of the replica transistor 306 is coupled to the output 302C of the amplifier 302. A drain terminal 306D of the replica transistor 306 is coupled to the power terminal 310. A source terminal 306S of the replica transistor 306 is coupled to the reference voltage output 244B.

A high voltage transient at the output terminal 106 increases the voltage at the power output 244A through the low voltage output transistor 208 before the protection transistor 212 and the protection transistor 214 are deactivated. Because the voltage regulator circuit 244 provides power to the digital output circuit 104 and to the protection circuit 108 (the gate terminal 216G of the transistor 216) from different transistors (power transistor 304 and replica transistor 306), the voltage at the gate terminal 216G of the transistor 216, that is compared to the voltage at the output terminal 106, is not affected by the voltage at the output terminal 106. Thus, the reference voltage provided to the comparator circuit 110 is not affected by high voltage at the output terminal 106.

Figure 4:
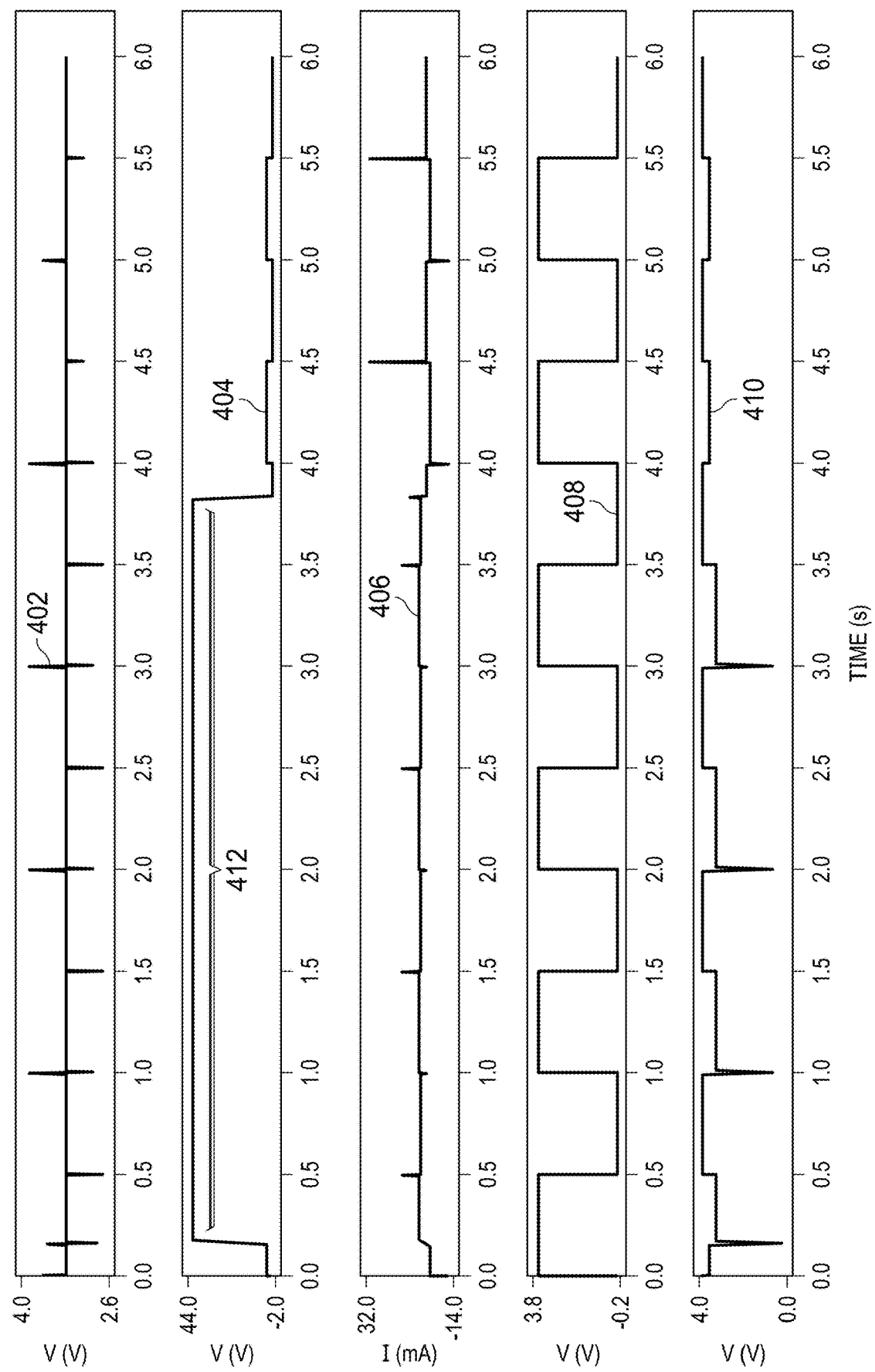
FIG. 4 shows example signals in the output circuit of FIG. 2.

FIG. 4 shows example signals in the output circuit 200. In FIG. 4, the digital output circuit 104 is driving the output terminal 106. The signal 408 is being driven to the output terminal 106 by the digital output circuit 104. The voltage 404 is the voltage at the output terminal 106. In the interval 412, the output terminal 106 is shorted to a high voltage (e.g., 42 volts). During the interval 412, the comparator circuit 110 detects that the voltage at the output terminal 106 is greater than the voltage (VIO_REPLICA) at the gate terminal 216G of the transistor 216 and deactivates the protection transistor 212 and the protection transistor 214, which limits current 406 flowing at the output terminal 106.

The voltage 402 (VIO) powering the digital output circuit 104 and the voltage 410 at the gate terminal 216G of the transistor 216 are not substantially affected by the voltage increase in the interval 412. After the interval 412, the high voltage at the output terminal 106 is removed and the protection transistors 212 and 214 are activated to pass signal from the digital output circuit 104 to the output terminal 106.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. An integrated circuit, comprising:
    an output terminal;
    an analog output circuit comprising an output coupled to the output terminal;
    a digital output circuit comprising an output;
    a protection circuit comprising:
        a protection transistor comprising:
            a first terminal coupled to the output of the digital output circuit;
            a second terminal coupled to the output terminal; and
            a control terminal; and
        a comparator circuit comprising:
            a first input coupled to the output terminal;
            a second input coupled to a reference voltage source; and
            an output coupled to the control terminal of the protection transistor;
    wherein the comparator circuit comprises:
    a first transistor comprising:
        a first terminal coupled to the output terminal;
        a second terminal coupled an output of a voltage regulator circuit; and
        a third terminal.

2. The integrated circuit of claim 1, wherein the voltage regulator circuit comprises:
    a power output coupled to the digital output circuit;
    a reference voltage output coupled to the second terminal of the first transistor;
    a power transistor comprising a source terminal coupled to the power output; and
    a replica transistor comprising:
        a gate terminal coupled to a gate terminal of the power transistor; and
        a source terminal coupled to the reference voltage output.

3. The integrated circuit of claim 1, wherein the comparator circuit comprises:
    a current mirror circuit, comprising:
        a diode-connected transistor comprising:
            a first terminal coupled to the third terminal of the first transistor;
            a second terminal coupled to the first terminal of the diode-connected transistor; and a third terminal coupled to ground; and
a third transistor comprising:
a first terminal coupled to a current source;
a second terminal coupled to the second terminal of the diode-connected transistor; and
a third terminal coupled to ground.

4. The integrated circuit of claim 3, wherein the protection circuit further comprises:
a fourth transistor comprising:
a first terminal coupled to the control terminal of the protection transistor;
a second terminal coupled to the first terminal of the third transistor; and
a third terminal coupled to ground.

5. The integrated circuit of claim 4, wherein the protection circuit further comprises:
a fifth transistor comprising:
a first terminal coupled to the third terminal of the fourth transistor;
a second terminal coupled to an enable terminal; and
a third terminal coupled to ground.

6. The integrated circuit of claim 4, wherein the protection circuit further comprises:
a Zener diode comprising:
a cathode terminal coupled to the output terminal; and
an anode terminal;
a fifth transistor comprising:
a first terminal coupled to the third terminal of the fourth transistor;
a second terminal coupled to the anode terminal of the Zener diode; and
a third terminal; and
a sixth transistor comprising:
a first terminal coupled to the second terminal of the protection transistor;
a second terminal coupled to the third terminal of the fifth transistor; and
a third terminal coupled to the control terminal of the protection transistor.

7. An integrated circuit, comprising:
an output terminal;
an analog output circuit configured to drive the output terminal;
a digital output circuit configured to drive the output terminal;
a protection circuit coupled to the digital output circuit and the output terminal;
wherein the protection circuit is configured to:
compare a voltage at the output terminal to a voltage that powers the digital output circuit; and
disconnect the digital output circuit from the output terminal based on the voltage at the output terminal being greater than the voltage that powers the digital output circuit.

8. The integrated circuit of claim 7, wherein the protection circuit comprises:
a first protection transistor and a second protection transistor configured to isolate the digital output circuit from the output terminal.

9. The integrated circuit of claim 8, wherein the protection circuit comprises:
a comparator circuit configured to deactivate the first protection transistor and the second protection transistor based on the voltage at the output terminal being greater than the voltage that powers the digital output circuit.

10. The integrated circuit of claim 9, further comprising a voltage regulator circuit comprising:
a power transistor;
a power output coupled to the power transistor, and configured to power the digital output circuit;
a replica transistor coupled to the power transistor; and
a reference voltage output coupled to the replica transistor, and configured to provide a reference voltage to the comparator circuit.

11. The integrated circuit of claim 8, wherein the protection circuit comprises:
a first transistor configured to deactivate the first protection transistor and a second protection transistor based on the voltage at the output terminal being greater than a reference voltage.

12. The integrated circuit of claim 11, wherein the protection circuit comprises:
a Zener diode configured to set the reference voltage as a predetermined voltage at the output terminal.

13. An output protection circuit, comprising:
an input;
an output;
a first transistor comprising:
a first terminal coupled to the input of the output protection circuit;
a second terminal; and
a control terminal;
a second transistor comprising:
a first terminal coupled to the second terminal of the first transistor;
a second terminal coupled to the output of the output protection circuit; and
a control terminal coupled to the control terminal of the first transistor; and
a comparator circuit comprising:
a first input coupled to the output of the output protection circuit;
a second input coupled to a reference voltage source; and
an output coupled to the control terminal of the first transistor;
wherein the comparator circuit comprises:
a third transistor comprising:
a first terminal coupled to the output of the output protection circuit;
a second terminal coupled an output of a voltage regulator circuit;
and a third terminal.

14. The output protection circuit of claim 13, wherein the comparator circuit comprises:
a current mirror circuit, comprising:
a diode-connected transistor comprising:
a first terminal coupled to the third terminal of the third transistor;
a second terminal coupled to the first terminal of the diode-connected transistor; and
a third terminal coupled to ground; and
a fourth transistor comprising:
a first terminal coupled to reference current source;
a second terminal coupled to the second terminal of the diode-connected transistor; and
a third terminal coupled to ground.

15. The output protection circuit of claim 14, further comprising:
a fifth transistor comprising:
a first terminal coupled to the control terminal of the first transistor;

a second terminal coupled to the first terminal of the fourth transistor; and
a third terminal coupled to ground; and
a sixth transistor comprising:
a first terminal coupled to the third terminal of the fifth transistor;
a second terminal coupled to an enable terminal; and
a third terminal coupled to ground.

16. The output protection circuit of claim 15, further comprising:
a Zener diode comprising:
a cathode terminal coupled to the output of the output protection circuit; and
an anode terminal;
a seventh transistor comprising:
a first terminal coupled to the third terminal of the fifth transistor;
a second terminal coupled to the anode terminal of the Zener diode; and
a third terminal; and
an eighth transistor comprising:
a first terminal coupled to the second terminal of the first transistor;
a second terminal coupled to the third terminal of the seventh transistor; and
a third terminal coupled to the control terminal of the first transistor.

17. The output protection circuit of claim 13, further comprising:
a voltage regulator comprising:
a power transistor;
a power output coupled to the power transistor, and configured to power a digital output circuit coupled to the output protection circuit;
a replica transistor coupled to the power transistor; and
a reference voltage output coupled to the replica transistor and the second input of the comparator circuit.

* * * * *